US007148940B2

United States Patent
Lee et al.

(10) Patent No.: US 7,148,940 B2
(45) Date of Patent: Dec. 12, 2006

(54) REFLECTIVE LIQUID CRYSTAL DISPLAY FOR DUAL DISPLAY

(75) Inventors: Seok-Lyul Lee, Taoyuan Hsien (TW); Tean-Sen Jen, Taoyuan Hsien (TW); Ming-Tien Lin, Lujhou (TW)

(73) Assignee: Hannstar Display Corp., Taipei (TW)

( * ) Notice: Subject to any disclaimer, the term of this patent is extended or adjusted under 35 U.S.C. 154(b) by 164 days.

(21) Appl. No.: 10/885,435

(22) Filed: Jul. 6, 2004

(65) Prior Publication Data
US 2005/0105021 A1 May 19, 2005

(30) Foreign Application Priority Data
Nov. 13, 2003  (TW) .............................. 92131761 A

(51) Int. Cl.
*G02F 1/1335* (2006.01)
(52) U.S. Cl. ..................................................... 349/113
(58) Field of Classification Search ................ 349/113, 349/114
See application file for complete search history.

(56) References Cited

U.S. PATENT DOCUMENTS 6,466,292 B1 * 10/2002 Kim ........................... 349/143

* cited by examiner

*Primary Examiner*—Andrew Schechter
*Assistant Examiner*—Richard Kim
(74) *Attorney, Agent, or Firm*—Thomas, Kayden, Horstemeyer & Risley

(57) ABSTRACT

A reflective liquid crystal display panel for dual display. The panel has a plurality of pixels and each pixel having first and second display regions. Each pixel includes a first substrate and a second substrate opposite thereto, wherein the first substrate includes a pixel driving device. A first reflective layer is formed overlying the first substrate in the first display region. A second reflective layer is formed overlying an interior of the second substrate in the second display region. A liquid crystal layer is interposed between the first substrate and the second substrate.

16 Claims, 6 Drawing Sheets

REFLECTIVE LIQUID CRYSTAL DISPLAY FOR DUAL DISPLAY

BACKGROUND OF THE INVENTION

1. Field of the Invention

The present invention relates to a reflective type liquid crystal display (RLCD) panel, and more particularly, to an RLCD panel of a dual display for displaying data on the front and rear surfaces thereof.

2. Description of the Related Art

High definition, multicolor displays, low power consumption, lower voltage requirements and light weight make liquid crystal displays (LCDs) a leading display device technology. LCDs, for example, have been used for several years as displays in, personal digital assistants (PDAs), portable computers, mobile phones, and the like.

Recently, a folding type mobile phone, taking advantage of the advances in fabrication techniques and the user desire to display data on the front and rear surfaces of the folding portion (or upper housing) thereof, has been developed. A conventional folding type mobile phone utilizes two individual LCDs whose rear surfaces are in contact with each other to achieve a dual-display.

However, since the conventional display device uses two individual displays, two sets of electrical equipment for driving the LCDs are required. Accordingly, the display device increases in size and weight, as does the fabrication cost.

SUMMARY OF THE INVENTION

The object of the present invention is to provide an RLCD panel for dual display.

Another object of the present invention is to provide an RLCD panel with a single liquid crystal layer.

In order to achieve these objects, the present invention provides a reflective liquid crystal display panel for dual display. The panel has a plurality of pixels each with first and second display regions, comprising a first substrate and a second substrate opposite thereto. A first transparent electrode is formed on the first substrate. A first reflective layer is formed overlying the first substrate in the first display region. A second transparent electrode is formed overlying the interior of the second substrate. A second reflective layer is formed on the second transparent electrode in the second display region. A liquid crystal layer is interposed between the first substrate and the second substrate.

In order to achieve these objects, the present invention also provides another reflective liquid crystal display panel for dual display. The panel has a plurality of pixels each with first and second display regions, comprising a first substrate and a second substrate opposite thereto. A first transparent electrode is formed on the first substrate. A first reflective layer is formed overlying the first substrate in the first display region. A second reflective layer is formed overlying the interior of the second substrate in the second display region. A color filter is formed on the second substrate and the second reflective layer. A second transparent electrode is formed on the color filter. A liquid crystal layer is interposed between the first substrate and the second substrate.

The present invention improves on the conventional technology in that each pixel of the dual-display RLCD panel has a first reflective layer formed on the first substrate in the first display region and a second reflective layer formed on the second substrate in the second display region. In addition, the first and second display regions (or reflective layers) are defined in each pixel so the front surface area of the display panel is the same as the rear surface area thereof. Thus, the RLCD structure with a single liquid crystal layer according to the invention can display data on both surfaces thereof, thereby reducing cost and volume and ameliorating the disadvantages of the conventional technology.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Figure 1A:
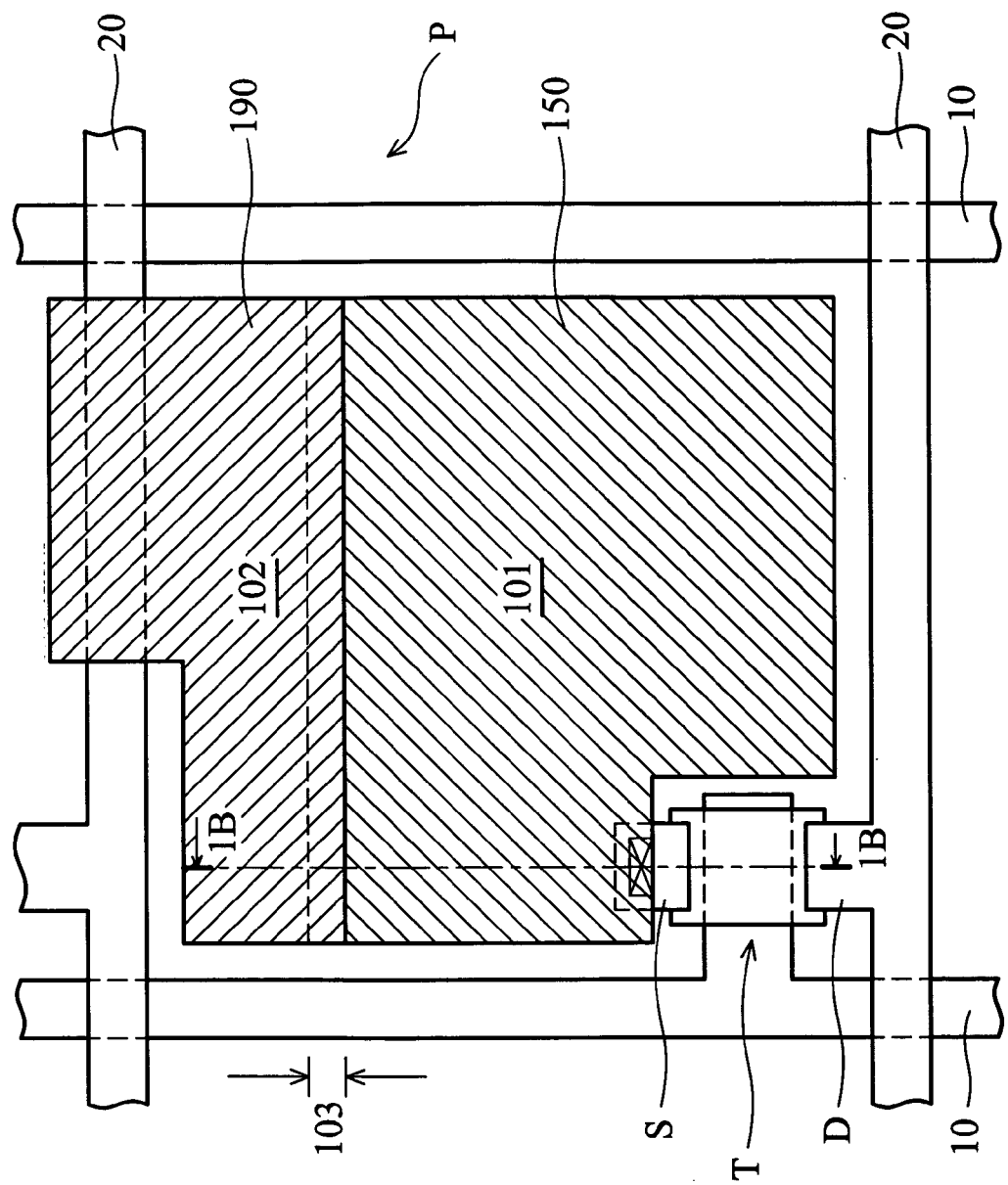
FIG. 1A is a top view of one pixel of a dual-display RLCD according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

First Embodiment

Figure 1B:
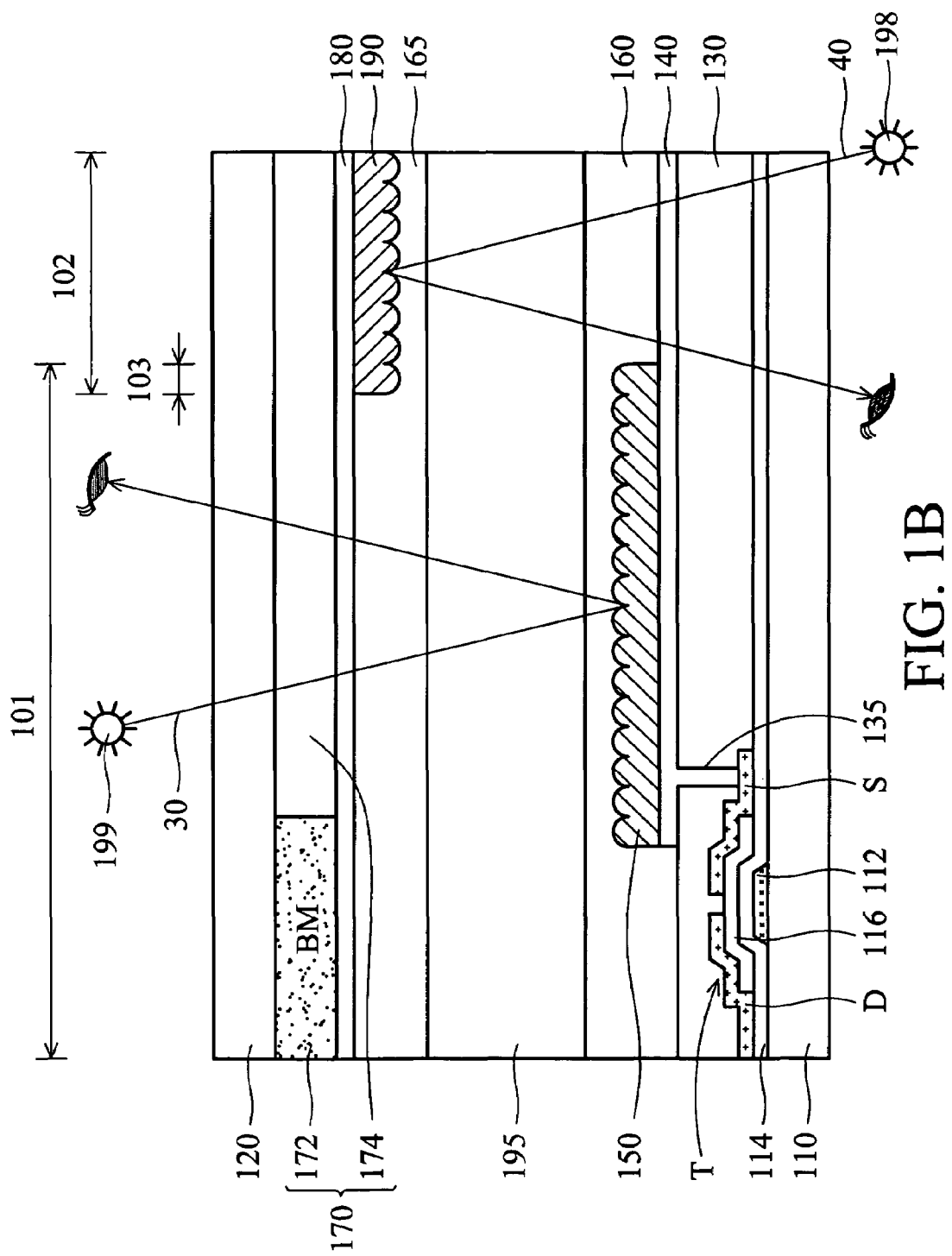
FIG. 1B is a sectional view of the dual-display RLCD taken along line 1B—1B in FIG. 1A.

FIG. 1A is a top view of one pixel of a dual-display RLCD panel according to the first embodiment of the present invention. FIG. 1B is a sectional view of the dual-display RLCD panel taken along line 1B—1B in FIG. 1A. In FIG. 1A, the dual-display RLCD panel comprises a plurality of pixel regions P (or display regions) arranged in an array matrix. The pixel regions P are defined by the gate lines 10 and data lines 20. In order to simplify the illustration, FIGS. 1A and 1B show a panel section in one pixel region P, although there may be a large number of pixel regions P.

In FIGS. 1A and 1B, each pixel P has a first display region 101 and a second display region 102. An overlap 103 is between the first display region 101 and the second display region 102. To avoid light leakage, the width of the overlap 103 preferably exceeds 2 µm. Here, the first display region 101 can serve as a main display region and the second display region 102 can serve as an auxiliary display region. The composition of each pixel region P is described as follows.

A first substrate 110 and a second substrate 120 opposite the first substrate 110 are provided. The first substrate 110 can be a glass substrate comprising a pixel driving device, such as a thin film transistor (TFT) T, for example, a bottom-gate type transistor. Symbol 112 denotes a gate. Symbol 114 denotes a gate insulating layer. Symbol 116 denotes a semiconductor island. Symbol S denotes a source electrode. Symbol D denotes a drain electrode. The second substrate 120 can be a glass substrate. The detailed process for forming thin film transistor T is described in U.S. Pat.

No. 6,342,935 and other references, and is therefore not discussed herein to avoid obscuring aspects of the present invention.

A protective layer 130 covering the thin film transistor T is formed on the first substrate 110. The protective layer 130 can be an oxide layer or an organic insulating layer formed by, for example, deposition or coating.

A first transparent electrode 140 serving as a pixel electrode is formed on the protective layer 130. The first transparent electrode 140 is electrically connected to the thin film transistor T by means of a through hole 135. The first transparent electrode 140 can be an indium tin oxide (ITO) layer or an indium zinc oxide (IZO) layer formed by, for example, sputtering.

A first reflective layer 150 is formed on the first transparent electrode 140 in the first display region 101. In order to avoid glare, the surface profile of the first reflective layer 150 is preferably rough. The material of the first reflective layer 150 can be aluminum (Al), silver (Ag) or a multilevel material comprising alumina ($Al_xO_y$) and aluminum (Al), wherein the multilevel material is an anti-glare material.

A first alignment film 160 (also referred to as an orientation film) is formed on the protective layer 130 to cover the first transparent electrode 140 and the first reflective layer 150.

A color filter 170 is formed on the interior of the second substrate 120. The color filter 170 comprises a black matrix (BM) area 172 and a color area 174 (for example, red, green or blue).

A second transparent electrode 180 serving as a common electrode is formed on the color filter 170. The second transparent electrode 180 can be an indium tin oxide (ITO) or indium zinc oxide (IZO) layer formed by, for example, sputtering.

A second reflective layer 190 is formed on the second transparent electrode 180 in the second display region 102. In order to avoid glare, the surface profile of the second reflective layer 190 is preferably rough. The material of the second reflective layer 190 can be aluminum (Al), silver (Ag) or a multilevel material comprising alumina ($Al_xO_y$) and aluminum (Al), wherein the multilevel material is an anti-glare material. It is noted that there is an overlap 103 between the first reflective layer 150 and the second reflective layer 190. The width of the overlap 103 can exceed 2 μm. In addition, the display brightness of the first and second display regions 101 and 102 is determined by the area of the first and second reflective layers 150 and 190. For example, when the area of the first reflective layer 150 is 2~3 times greater than that of the second reflective layer 190, the display brightness of the first display region 101 can exceed that of the second display region 102. For another example, when the area of the first reflective layer 150 is the same as the second reflective layer 190, the display brightness of the first and second display region 101 and 102 is approximately equal.

A second alignment film 165 covering the second reflective layer 190 is formed on the second transparent electrode 180. Then, a liquid crystal material fills a space between the first substrate 110 and the second substrate 120 to form a liquid crystal layer 195.

In FIG. 1B, a first light source 198 can be disposed on the exterior of the first substrate 110. The first light source 198 can be a light emitting module including a light emitting diode (LED) and a light guiding panel. When the first light source 198 is in the ON state, the first light source 198 serves as a front light for the RLCD panel in the second display region 102. When the first light source 198 is in the OFF state, an environmental (or ambient) light serves as a reflective light source for the RLCD panel in the second display region 102.

In addition, a second light source 199 can also be disposed on the exterior of the second substrate 120. The second light source 199 can be a light emitting module including a light emitting diode (LED) and a light guiding panel. When the second light source 199 is in the ON state, the second light source 199 serves as a front light for the RLCD panel in the first display region 101. When the second light source 199 is in the OFF state, an environmental (or ambient) light serves as a reflective light source for the RLCD panel in the first display region 101.

FIG. 1B is a sectional view illustrating the operation of the RLCD of the first embodiment. In the first display region 101 of the pixel P, a reflective light 30 from the second light source 199 or the ambient light reflects from the first reflective layer 150 and displays the image on the outer side of the second substrate 120 (i.e. a viewer in the first display region 101). In the second display region 102 of the pixel P, a reflective light 40 from the first light source 198 or the ambient light reflects from the second reflective layer 190 and displays the image on the outer side of the first substrate 110 (i.e. another viewer in the second display region 102).

It is noted that the light 30 penetrates the color filter 170 such that the first display region 101 can display a colored image. Since the light 40 does not penetrate the color filter 170, the second display region 102 displays a monochromatic image.

Figure 2:
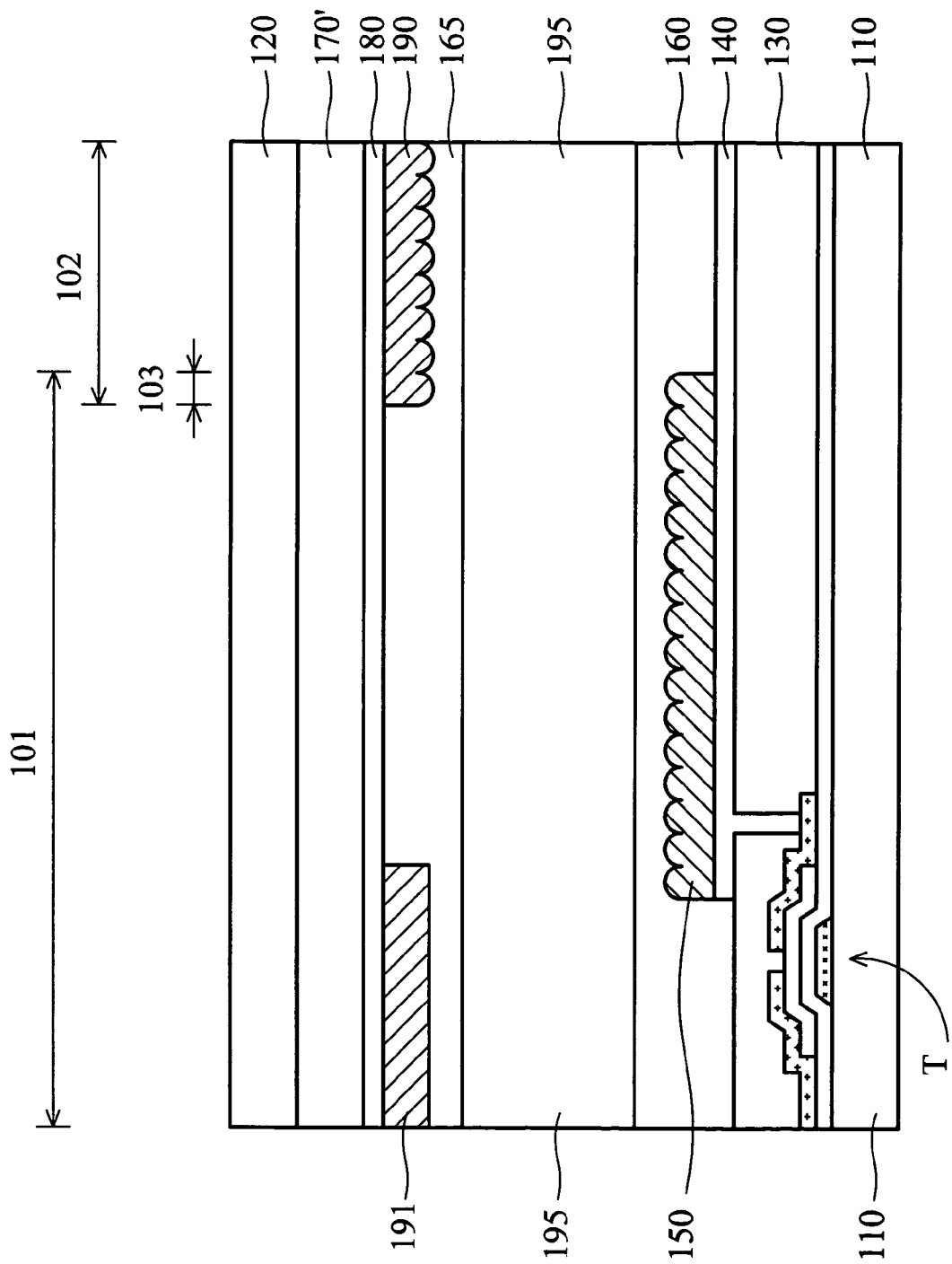
FIG. 2 is a sectional view of the dual-display RLCD according to a modification of the first embodiment.

FIG. 2 is a sectional view of the dual-display RLCD according to a modification of the first embodiment. In the modification, a light shield 191 is formed rather than the black matrix area 172, preventing the color filter 170' from experiencing light leakage.

The light shield 191 and the second reflective layer 190 can be simultaneously defined on part of the second transparent electrode 180. That is, the material of the light shield 191 and the second reflective layer 190 can be the same, formed by the same deposition and photolithography procedures. Thus, the modified embodiment does not require additional processes to form the black matrix area 172 in the color filter 170, providing reduced costs.

Second Embodiment

Figure 3:
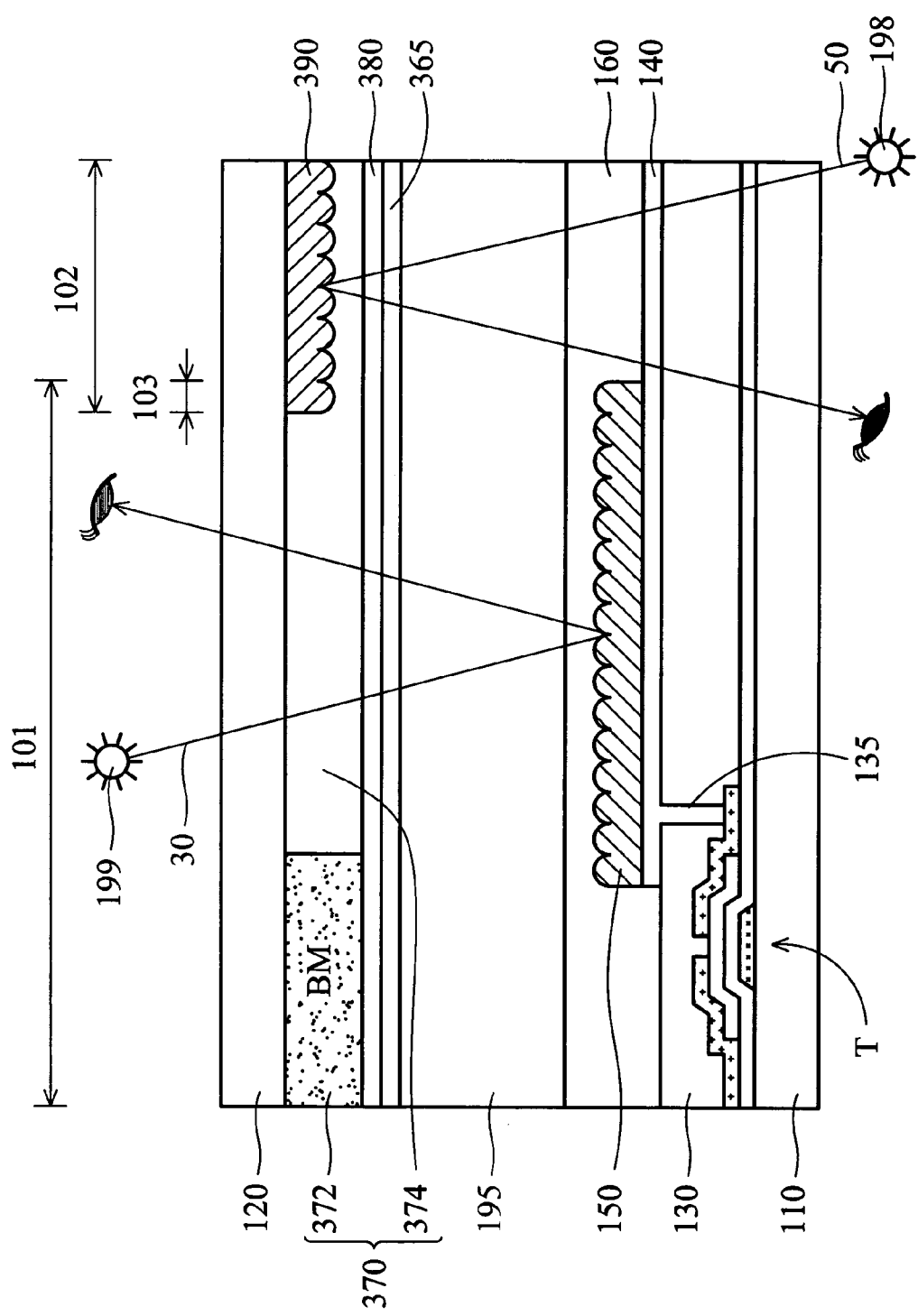
FIG. 3 is a sectional view of a dual-display RLCD according to a second embodiment of the present invention.

FIG. 3 is a sectional view of a dual-display RLCD according to a second embodiment of the present invention. Similar to the above, the dual-display RLCD panel of the second embodiment comprises a plurality of pixel regions P (or display regions) In order to simplify the illustration, FIG. 3 shows a panel section in one pixel region. Elements in the second embodiment repeated from the first embodiment use the same reference numbers.

In FIG. 3, each pixel has a first display region 101 and a second display region 102. An overlap 103 is between the first display region 101 and the second display region 102. In order to avoid light leakage, the width of the overlap 103 preferably exceeds 2 μm. Here, the first display region 101 can serve as a main display region and the second display region 102 can serve as an auxiliary display region. The composition of each pixel region follows.

A first substrate 110 and a second substrate 120 opposite thereto are provided. The first substrate 110 can be a glass substrate comprising a pixel driving device, such as a thin film transistor (TFT) T, for example, a bottom-gate type transistor.

A protective layer 130 covering the thin film transistor T is formed on the first substrate 110. The protective layer 130 can be an oxide layer or an organic insulating layer.

A first transparent electrode 140 serving as a pixel electrode is formed on the protective layer 130. The first transparent electrode 140 is electrically connected to the thin film transistor T by means of a plug 135. The first transparent electrode 140 can be an indium tin oxide (ITO) or indium zinc oxide (IZO) layer.

A first reflective layer 150 is formed on the first transparent electrode 140 in the first display region 101. In order to avoid glare, the surface profile of the first reflective layer 150 is preferably rough. The material of the first reflective layer 150 can be aluminum (Al), silver (Ag) or a multilevel material comprising alumina ($Al_xO_y$) and aluminum (Al). To avoid glare, the material of the first reflective layer 150 is preferably a multilevel material comprising alumina ($Al_xO_y$) and aluminum (Al).

A first alignment film 160 (also referred to as an orientation film) is formed on the protective layer 130 to cover the first transparent electrode 140 and the first reflective layer 150.

A second reflective layer 390 is formed on the interior of the second substrate 120 in the second display region 102. In order to avoid glare, the surface profile of the second reflective layer 390 is preferably rough. The material of the second reflective layer 390 can be aluminum (Al), silver (Ag) or a multilevel material comprising alumina ($Al_xO_y$) and aluminum (Al). To avoid glare, the material of the second reflective layer 390 is preferably a multilevel material comprising alumina ($Al_xO_y$) and aluminum (Al). It is noted that there is an overlap 103 between the first reflective layer 150 and the second reflective layer 390.

A color filter 370 is formed on the second substrate 120 and the second reflective layer 390. The color filter 370 comprises a black matrix area 372 and a color area 374 (for example, red, green or blue).

A second transparent electrode 380 serving as a common electrode is formed on the color filter 370. The second transparent electrode 380 can be an indium tin oxide (ITO) or indium zinc oxide (IZO) layer.

A second alignment film 365 is formed on the second transparent electrode 380. Then, a liquid crystal material fills a space between the first substrate 110 and the second substrate 120 to form a liquid crystal layer 195.

In FIG. 3, a first light source 198 is disposed on the exterior of the first substrate 110, such as a light emitting module including a light emitting diode (LED) and a light guiding panel. When the first light source 198 is in the ON state, the first light source 198 serves as a front light for the RLCD panel in the second display region 102. When the first light source 198 is in the OFF state, an environmental (or ambient) light serves as a reflective light source for the RLCD panel in the second display region 102.

In addition, a second light source 199 can also be disposed on the exterior of the second substrate 120, such as a light emitting module including a light emitting diode (LED) and a light guiding panel. When the second light source 199 is in the ON state, the second light source 199 serves as a front light for the RLCD panel in the first display region 101. When the second light source 199 is in the OFF state, an environmental (or ambient) light serves as a reflective light source for the RLCD panel in the first display region 101.

FIG. 3 is a sectional view illustrating the operation of the RLCD of the second embodiment. In the first display region 101 of each pixel, a reflective light 30 from the second light source 199 or the ambient light reflects from the first reflective layer 150 and displays the image on the outer side of the second substrate 120 (i.e. a viewer in the first display region 101). Nevertheless, in the second display region 102 of each pixel, a reflective light 50 from the first light source 198 or the ambient light reflects from the second reflective layer 390 and displays the image on the outer side of the first substrate 110 (i.e. another viewer in the second display region 102).

It is noted that the light 30 penetrates the color filter 370 such that the first display region 101 can display a colored image. The light 50 penetrates the color filter 370 such that the second display region 102 can also display a colored image.

Figure 4:
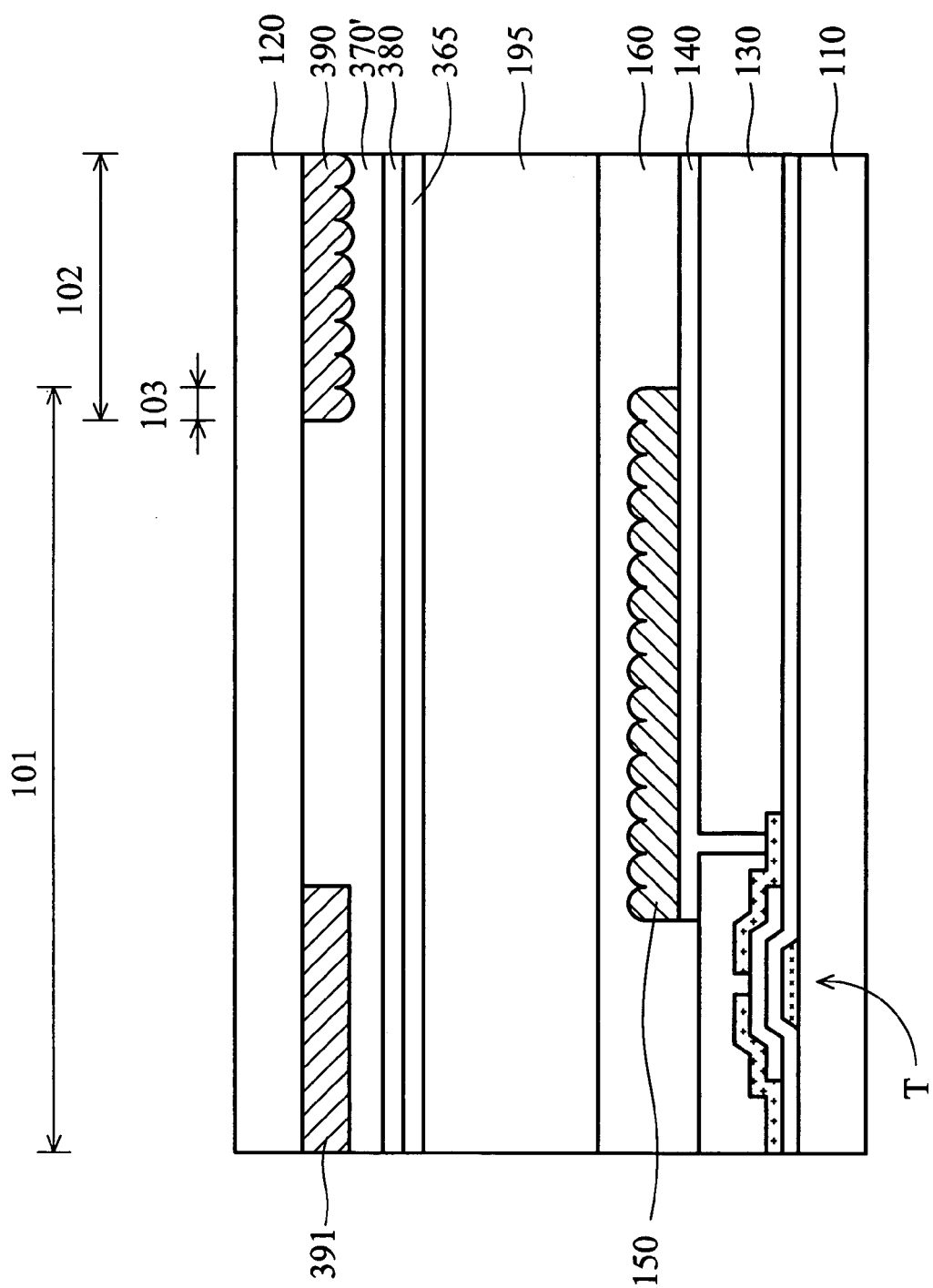
FIG. 4 is a sectional view of the dual-display RLCD according to a modification of the second embodiment.

FIG. 4 is a sectional view of the dual-display RLCD according to a modification of the second embodiment. In the modification, a light shield 391 is formed rather than the black matrix area 372, preventing the color filter 370' from experiencing light leakage.

The light shield 391 and the second reflective layer 390 can be simultaneously defined on part of the second substrate 120. That is, the material of the light shield 391 and the second reflective layer 390 can be the same, formed by the same deposition and photolithography procedures. Thus, the modified embodiment does not require additional processes to form the black matrix area 372 in the color filter 370, providing reduced costs.

Figure 5:
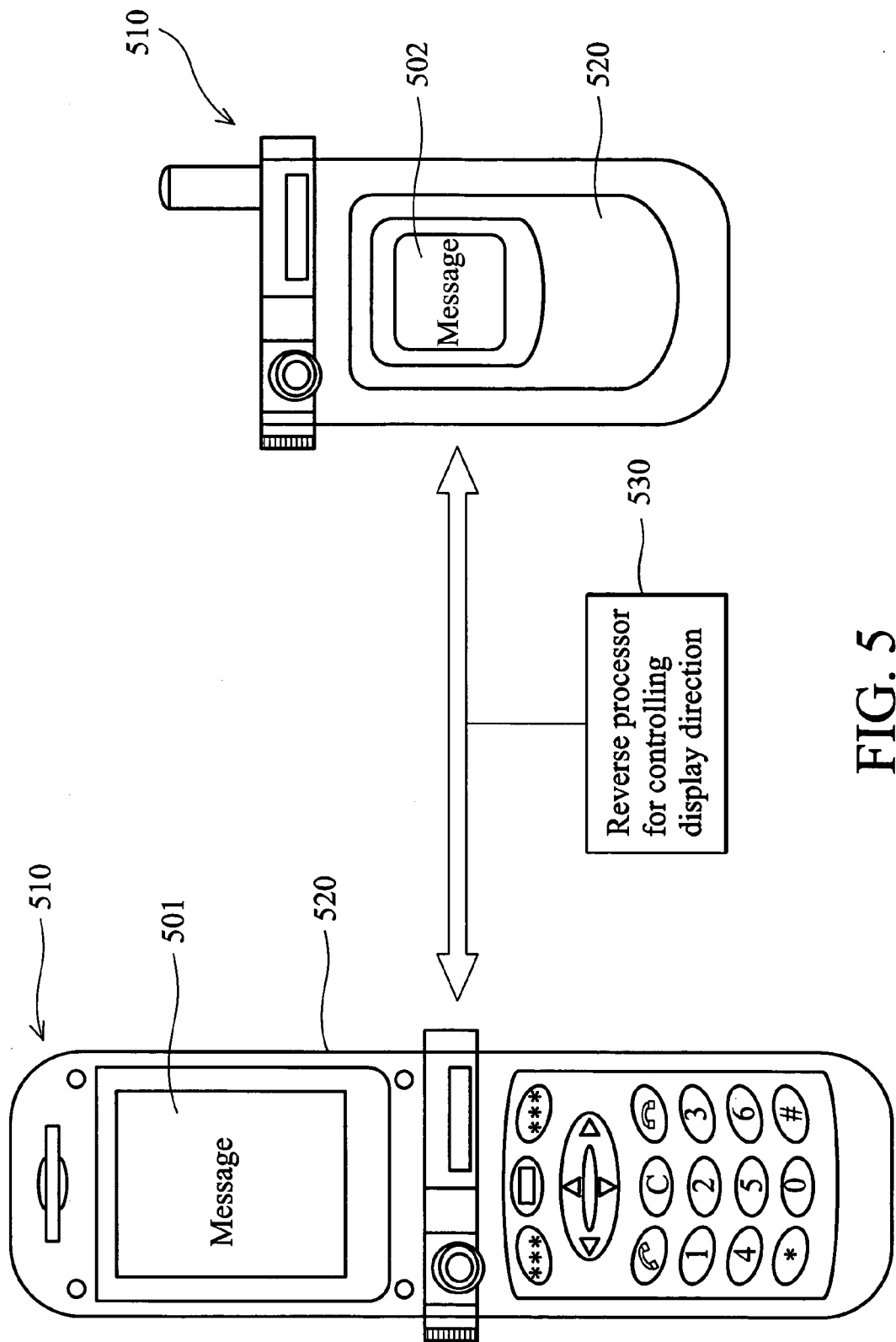
FIG. 5 is a schematic view showing an exemplary application of the present invention in a folding type mobile phone having a dual-display LCD.

FIG. 5 shows an exemplary application of the present invention in a folding type mobile phone 510 having the present dual-display RLCD. Symbol 501 denotes the main display region consisting of a plurality of first display regions 101, wherein the main display region 501 is typically located on the interior of the folding type mobile phone 510. Symbol 502 denotes the auxiliary display region consisting of a plurality of second display regions 102, wherein the auxiliary display region 502 is typically located on the exterior of the folding type mobile phone 510. The area of the main display region 501 can be the same as the auxiliary display region 502. Depending on design, part of the auxiliary display region 502 can be covered by outer housing 520 to reduce (or adjust) the display area, as shown as FIG. 5.

To control the display direction of the message, the present invention uses a switch (not shown) to detect whether the housing 520 of the folding type mobile phone 510 is open or closed. For example, when the housing 520 is closed, the display direction of the main display region 501 can be reversed by a reverse processor 530 to accommodate the desired display direction of the auxiliary display region 502.

Thus, the present invention provides a dual-display RLCD panel with a single liquid crystal layer, a first reflective layer formed on the first substrate in the first display region and a second reflective layer formed on the second substrate in the second display region. In addition, the first and second display regions (or reflective layers) are defined in each pixel so the front surface area of the display panel is the same as the rear surface area thereof. The display structure of the invention uses one display with only one set of electrical equipment for driving the RLCD, thereby reducing costs and volume and ameliorating the disadvantages of the conventional technology.

Finally, while the invention has been described by way of example and in terms of the above, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A reflective liquid crystal display panel for dual display, the panel comprising a plurality of pixels, each comprising first and second display regions and comprising:
   a first substrate and a second substrate opposite thereto, wherein the first substrate comprises a pixel driving device;
   a liquid crystal layer interposed between the first substrate and the second substrate;
   a first reflective layer interposed between the first substrate and the liquid crystal layer, and covering the first display region; and
   a second reflective layer interposed between the second substrate and the liquid crystal layer, and covering the second display region.

2. The reflective liquid crystal display panel according to claim 1, further comprising an overlap between the first reflective layer and the second reflective layer.

3. The reflective liquid crystal display panel according to claim 2, wherein a width of the overlap exceeds 2μm.

4. The reflective liquid crystal display panel according to claim 1, further comprising:
   a pixel electrode electrically connecting the pixel driving device formed on the first substrate; and
   a color filter formed on the second substrate.

5. A liquid crystal display panel for dual display, the panel comprising a plurality of pixels, each comprising first and second display regions and comprising:
   a first substrate and a second substrate opposite thereto;
   a liquid crystal layer interposed between the first substrate and the second substrate;
   a first transparent electrode formed on the first substrate;
   a first reflective layer interposed between the first substrate and the liquid crystal layer, and covering the first display region;
   a second transparent electrode formed overlying the second substrate; and
   a second reflective layer interposed between the second substrate and the liquid crystal layer, and covering the second display region.

6. The liquid crystal display panel according to claim 5, further comprising a first light source disposed on an exterior of the first substrate.

7. The liquid crystal display panel according to claim 5, further comprising a second light source disposed on an exterior of the second substrate.

8. The liquid crystal display panel according to claim 5, wherein the first substrate is a first glass substrate comprising a thin film transistor electrically connected to the first transparent electrode.

9. The liquid crystal display panel according to claim 5, wherein the second substrate is a second glass substrate comprising a color filter on the interior thereof.

10. The liquid crystal display panel according to claim 9, wherein the color filter comprises a black matrix area.

11. The liquid crystal display panel according to claim 9, wherein the color filter is disposed between the second substrate and the reflective layer.

12. The liquid crystal display panel according to claim 5, further comprising a light shield formed on part of the second transparent electrode, wherein the light shield and the second reflective layer are simultaneously defined.

13. The liquid crystal display panel according to claim 5, wherein the first and second transparent electrodes are indium tin oxide (ITO) or indium zinc oxide (IZO) layers.

14. The liquid crystal display panel according to claim 5, wherein the first and/or second reflective layers comprise aluminum, silver or a multilevel material comprising alumina ($Al_xO_y$) and aluminum.

15. The liquid crystal display panel according to claim 5, further comprising an overlap between the first reflective layer and the second reflective layer.

16. The liquid crystal display panel according to claim 15, wherein a width of the overlap exceeds 2μm.

* * * * *